United States Patent [19]
Hennings et al.

[11] Patent Number: 5,664,897
[45] Date of Patent: Sep. 9, 1997

[54] RELEASABLE CONNECTOR WITH SEVERABLE LINE

[75] Inventors: Elsa J. Hennings; Michael D. Herr; William A. Martin, all of Ridgecrest, Calif.

[73] Assignee: The United States of America as represented by the Secretary of the Navy, Washington, D.C.

[21] Appl. No.: 716,666

[22] Filed: Aug. 29, 1996

[51] Int. Cl.[6] .................................................. F16B 1/00
[52] U.S. Cl. ........................... 403/2; 403/31; 83/639.4; 89/1.14; 244/151 B
[58] Field of Search ........................... 83/639.4, 950; 89/1.14; 102/378; 124/25.6; 248/548; 403/2, 291, 28, 31, 32; 244/151 A, 151 B, 138 R; 242/602.1, 602.2, 609

[56] References Cited

U.S. PATENT DOCUMENTS

| | | | |
|---|---|---|---|
| 2,477,907 | 8/1949 | Smith | 89/1.14 X |
| 3,840,988 | 10/1974 | Hoffman | 244/151 B X |
| 5,471,888 | 12/1995 | McCormick | 403/28 X |

FOREIGN PATENT DOCUMENTS

| | | | |
|---|---|---|---|
| 27877 | 9/1924 | France | 242/602.1 |

*Primary Examiner*—Anthony Knight
*Assistant Examiner*—William L. Miller
*Attorney, Agent, or Firm*—Melvin J. Sliwka; Stephen J. Church

[57] ABSTRACT

A releasable connector for a pair of tensioned elements, such as straps supporting a parachuted load, has a cylindrical body separable at a diametrical plane into a pair of blocks each adapted for connection of the block to one of the elements. A helical groove is disposed about the body and is wound in one circumferential direction with the majority of an endless line of para-aramid fiber. The line is tensioned to hold the blocks in engagement so that the elements are joined by the connector. The ends of the groove return helically in the opposite circumferential direction, and the remainder of the line is wrapped in this opposite direction about the majority of the line. The body has a pair of recesses extending radially inwardly from the groove and individually receiving a pair of pyrotechnic line cutters. Each cutter extends into the groove and, at the groove, has an eye through which the line extends for severing by either cutter to release the blocks from engagement and disconnect the tensioned elements.

9 Claims, 2 Drawing Sheets

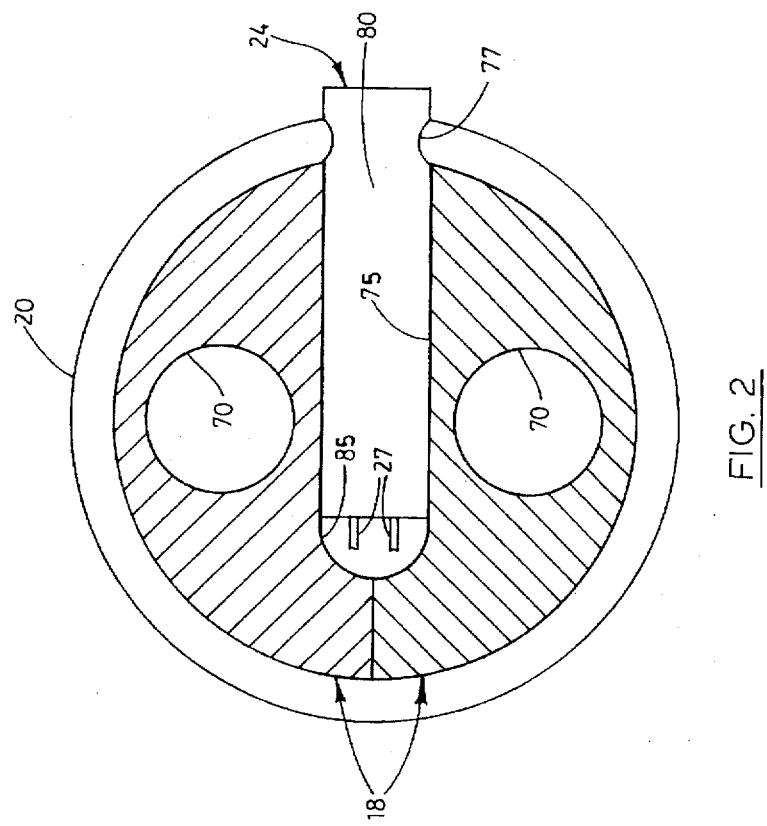
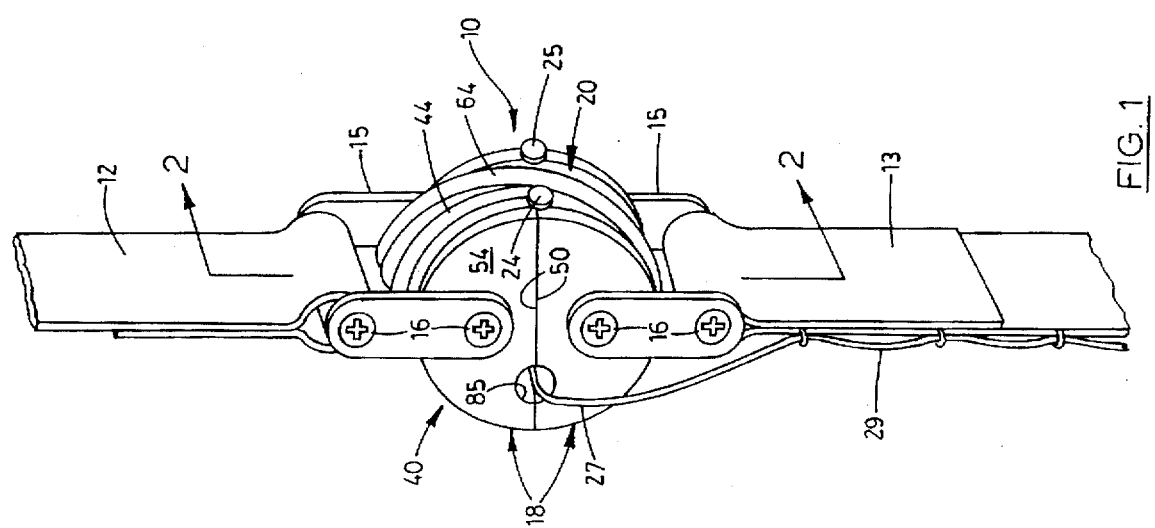
FIG. 2
FIG. 1

RELEASABLE CONNECTOR WITH SEVERABLE LINE

BACKGROUND OF THE INVENTION

1. Field of the Invention

The present invention pertains to a releasable or separable connector and, more particularly, to such a connector having a tensionable member severed by a pyrotechnic device.

2. Description of the Related Art

Typically a load being lowered, as by parachute with retrorocket retardation, must be released at a selected time from a tensioned element, such as a strap, supporting the load during lowering; and various releasable connector arrangements have been used for this purpose. In these arrangements a releasable connector disposed in the tensioned element is actuated from a suitable source of electrical energy at the selected time. Such a connector may be a mechanical device unlatched by a solenoid or, commonly with parachuted loads, a pyrotechnic cutter in which an electrically ignited squib provides gas pressure driving a piston-like blade into cutting relation with a supporting strap or the like.

These prior art arrangements have various deficiencies. Mechanical devices are heavy for their strength; and pyrotechnic cutters of a size to sever a single load supporting strap are expensive because they cannot be reused and, in some applications, may be dangerous because of the amount of energetic material required in a squib to sever such a single strap. Failure of a single such mechanical device or a pyrotechnic cutter would cause mission failure, but their duplication to provide redundancy would increase the problems with weight, expense, and pyrotechnic safety. In many applications of such a releasable connector, the connector must be compactly stowed together with a parachute, supporting straps, and the load so that the connector must be compact and not have any projecting portions that might be snagged during deployment. It is desirable that such a connector be usable and reusable with conventional parachute rigging links to the elements connected and released by the connector. A releasable connector subjected to relatively high temperatures, such as exhaust from a retrorocket, must not rely on materials weakened by these temperatures.

It is essential that shock loads on parachute opening or varying loads and relative movement at the connector, as might be caused by repetitive swinging of a load suspended from a parachute, not affect the load carrying capacity of the connector.

A further problem is that lines or straps under tension when such a releasable connector is in use must not become disengaged from the connector or snag connected elements due to stretching from such shock or varying loads. Stretching may be minimized by the use of materials such as extended chain polyethylene fiber or para-aramid fiber which have high tension strength and modulus of elasticity. However, the strength of extended chain polyethylene fibers decreases rapidly at temperatures above 100° C. and fibers of para-aramid material are brittle so that flexible elements constructed of this material are easily damaged by chafing due to such repetitive movement. Para-aramid fibers are greatly weakened by a bend that might form on deployment or be used in attaching such a flexible element, and it is highly desirable that para-aramid elements not be knotted or even pass over a rounded edge. Another problem is that it is difficult to provide and maintain even loading of paralelled, tensioned elements that must be equally loaded to minimize weight. It is especially difficult to provide this even loading with para-aramid fiber which has a high coefficient of friction, particularly with itself, and must not be subject to chaffing when subjected to shock and repetitive loads.

For many applications, it is highly desirable that such a releasable connector be low in cost, both initially and by being reusable, and yet be low in weight and bulk while being both safe and reliable in operation. In space applications the cost and the reusability of such releasable connectors are not significant; however, it is evident that all of the other problems and deficiencies are particularly severe and that no compromises are possible between weight, bulk, safety, and reliability.

BRIEF SUMMARY OF THE INVENTION

The present invention is a releasable connector for a pair of tensioned elements, such as straps supporting a parachuted load. The connector has a cylindrical body separable at a diametrical plane into a pair of blocks each adapted for connection to such an element. A helical groove of several turns extends about the body and is wound in one circumferential direction with the majority of an endless line that is tensioned to hold the blocks in engagement so that the pair of elements are joined by the connector. The ends of the groove have regions of less than a half turn in length that return helically in the opposite circumferential direction, and the remainder of the line is wrapped in this opposite direction about the majority of the line. The return regions of the groove allow the line to be endless and without knots, sharp bends, or passage over edges.

The body has a pair of recesses extending radially inwardly from the groove and individually receiving a pair of conventional pyrotechnic line cutters. Each cutter extends from its recess into the groove and, at the groove, has an eye through which the line extends for severing by either cutter to release the blocks from engagement and disconnect the tensioned elements. The use of more than one pyrotechnic cutter provides redundancy to ensure release of the connector if one cutter or its actuating circuit fails.

The connector can withstand a tension force equal to twice the number of turns of the line about the cylinder times the tensile breaking strength of the line; and the use of a helical groove and endless line permits the line to move in the groove and equalize the stress on each turn of the line in the groove. As a result, the tensile strength of the line is a fraction of the total tension that the connector can withstand and dependably release, and the pyrotechnic cutters require a fraction of the energetic material needed in a cutter capable of severing a single element carrying this total tension. The connector is economically reusable by replacing the line and the relatively small pyrotechnic cutters.

To minimize the number of such turns and thus the bulk and weight of the body, the line is constructed of a relatively high tensile strength material, para-aramid fiber being preferred when the connector may be exposed to temperatures up to about 350° C. This and other suitable materials have a high modulus of elasticity to limit elongation of the line relative to the body. This limited elongation of the line and its reception in the groove prevent slack that might allow the line to escape from the groove and engage a member linking the strap to the connector when the connector is tensioned by a shock load. This limited elongation also prevents chafing of the line due to its movement in the groove when the connector is subjected to a varying tension as when supporting a load oscillating from a parachute.

It is an object of the present invention to provide for tensioned elements a connector that is releasable at a selected time and is light in weight and yet has high strength.

Another object is to provide such a connector that is easily and economically reusable.

Still another object is to provide such a connector that has redundant releasing arrangements.

Yet another object is to provide a releasable connector meeting the above objects and usable with existing parachute connectors and pyrotechnic cutters.

A further object is to provide for such a connector arrangements advantageously incorporating para-aramid fiber.

BRIEF DESCRIPTION OF THE SEVERAL VIEWS OF THE DRAWING

The above and other objects, advantages, and novel features of the present invention will be apparent from the following detailed description when considered with the accompanying drawings in which:

FIG. 1 is a perspective view of a releasable connector embodying the principles of the present invention, the connector being depicted in a representative operating environment;

FIG. 2 is a section of the connector from the position of line 2—2 of FIG. 1;

DETAILED DESCRIPTION

Figure 4:
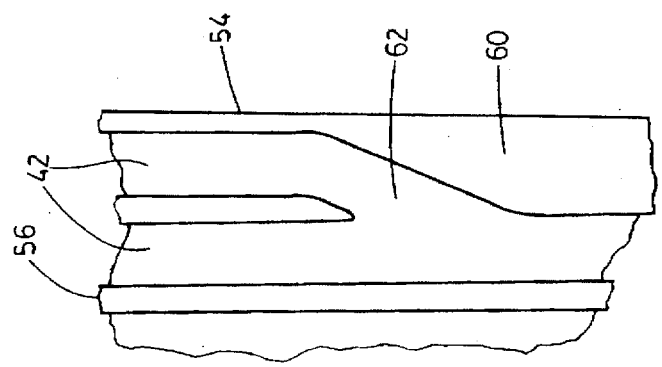
FIG. 4 is a fragmentary view of the body from a radial direction approximately normal to that of FIG. 3 showing a groove that is generally helical in one direction about the body and has an end segment returning helically in the opposite direction.

FIG. 1 shows a releasable connector 10 embodying the present invention and disposed in a representative operating environment which includes a pair of fragmentarily represented straps 12 and 13 connected individually to a pair of parachute links 15 which, for connection of the links to other elements, are disassembled by screws 16. The links, in turn, individually connect the straps to a pair of engaged blocks or body portions 18 of the connector. The straps and links are of conventional construction and, in operation, are tensioned in a direction away from the connector as by a retrorocket or parachute attached to strap 12 and by a supported load, such as a Martian Lander attached to strap 13. The balance of the straps and the devices so attached are not shown and are not part of the present invention which is, in any event, suitable for the connection and selective disconnection of any devices suitably connected by tensioned elements.

Connector 10 has a line 20 which is wrapped helically about both of the blocks 18 and which characterizes the present invention. The line holds the blocks in engagement so as to connect straps 12 and 13 through the connector, and the line is severable by either of a pair of pyrotechnic cutters 24 and 25 so as to disconnect the straps at the connector. The cutters may be of conventional construction, as available from Roberts Research Laboratory of Torrance, Calif. and are electrically actuated at a selected time by electrical energy provided in any suitable manner, which is not a portion of the present invention, to firing leads 27 of the cutters. In the representative environment of FIG. 1, this energy is provided by extended leads 29 associated with strap 13 and the load attached thereto.

As shown in the Figures, blocks 18 are configured so that when engaged they form a generally cylindrical body 40 of connector 10. Blocks 18 are substantially identical except as necessary to define a continuous helical groove 42 extended peripherally about the body and receiving the majority or first portion 44 of line 20.

Each block 18 has a planar first surface 50 corresponding to a diametrical plane of body 40. The blocks are engageable at these surfaces to form the body, and the body is separable at this plane. Each block has a generally semicylindrical second surface 52 disposed oppositely of its planar surface and forming with the second surface of the other block a continuous and generally cylindrical peripheral surface of the body when the blocks are engaged and aligned axially. Each block also has opposite planar end surfaces which form opposite axial end surfaces 54 of the body when the blocks are engaged and aligned.

Semicylindrical surfaces 52 of blocks 18 bear a plurality of ridges 56 extended from these surfaces and curved about the axis of the peripheral surface of body 40. The ridges have individual opposite ends 58 disposed at the block planar surface 50, the ridges 56 being configured so that, when the blocks are so engaged and aligned, corresponding ridge ends 58 are aligned axially of the body and the ridges define between them the helical groove 42. The turns of this groove correspond to and individually receive turns of the line portion 44 when the line is wrapped helically about the body. Ridges 56 thus retain the line on the block surfaces 52 against movement of the line axially along the block surfaces 50 and 52 and retain the line portion 44 in its helical disposition about the block surfaces 52.

Groove 42 is semi-circular and has a predetermined depth in a direction radially of the generally cylindrical peripheral surface of body 40. This depth corresponds to the cross sectional radius of the line 20 which is, typically, circular and of the well-known braided and coreless construction utilized with both para-aramid and extended chain polyethylene fibers. Suitable para-aramid braided cord is specified in Military Specification MIL-C-87129A, and suitable extended chain polyethylene material is made by Allied-Signal Inc. of Petersburg, Va.

Figure 3:
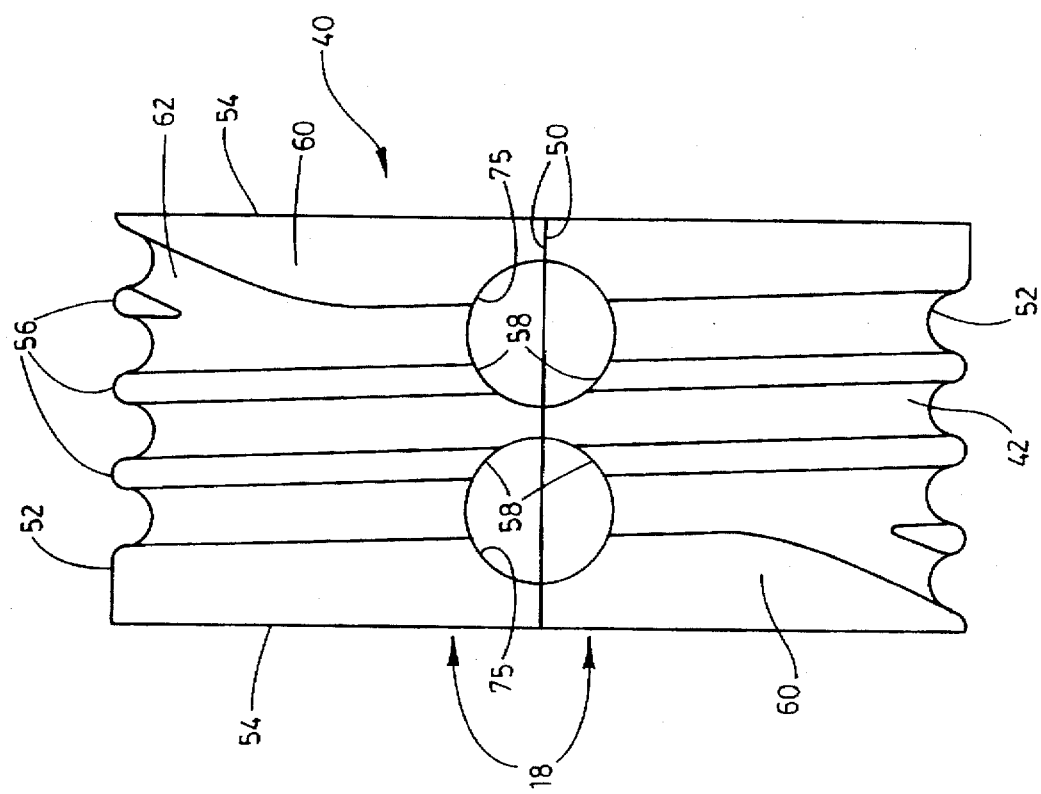
FIG. 3 is a of a cylindrical body used in the connector, the view being in a direction radially of the body.

Axially centrally of body 40, groove 42 is helical in one direction about the axis of this body and thus receives the first line portion 44 disposed in this same helical disposition. However as shown in FIGS. 3 and 4, each block 18 has, included in the plurality of ridges 56 and at one body end surface 54, a ridge 60 which defines a helical groove segment 62 returning in the opposite helical direction toward the opposite body end surface. The segments 62 are about one-eighth turn in length and, at each axial end of the body, divert, as best shown in FIG. 1, a second portion 64 of the line 20 from the helical disposition of the line first portion into an opposite helical disposition of the second line portion about the first line portion. The second line portion is of about one-half turn and thus of lesser pitch than the first line portion. The ends of each of the line portions 44 and 64 are joined by the other of the line portions with the line being tensioned against the body 40 to hold the blocks 18 in engagement at their surfaces 50 when the connector 10 is in tension between the straps 12 and 13. It is apparent that the opposite ends of the line portions are then connected at the cylindrical periphery of the body 40 so that tension of the line maintains first line portion 44 in groove 42 in radially tensioned relation against the body and thus maintains the blocks 18 in engagement at their planar first surfaces 50 which are in a diametrical plane of the body. It is also apparent that tension in the line tensions the second line portion 64 in a direction radially of the body first the turns of the first line portion oppositely of the first line portion from the semicylindrical second surfaces 52 of the blocks.

Line 20 is effectively endless since the ends of a length of fibrous cord forming the line are connected in any suitable manner at the periphery of body 40 to appropriately tension the line in groove 42 while no load is placed on connector 10 from the straps 12 and 13. Typically and as before mentioned, the line is of coreless, braided construction so that the length of cord is conveniently spliced at line second portion 64 by a well-known finger trap splice, not shown. With para-aramid fiber coreless and braided cord, a finger trap splice is somewhat weaker than unspliced such cord; however, the reduction in strength is less than if the cord were anchored or spliced in some other manner. In forming this splice one end of the length of cord is inserted within the opposite end of this length of cord until line 20 is suitably tensioned about body 40.

When line 20 is so tensioned about body 40 it is evident that the line maintains the blocks 18 in engagement at their surfaces 50 so that the tensionable straps 12 and 13 are connected at connector 10 by tension in the line 20. It is also evident that when these straps are tensioned, the line elongates at each turn in the helical groove 42. The use of relatively high tensile strength fiber materials such as those identified above for the line minimizes the number of turns of the line and groove 42 and thus minimizes the length, and therefore the bulk and weight of the body. However the relatively high modulus of elasticity provided by these materials is also important in that, at a predetermined design tension in the straps, the elongation of the line first portion 44 at each turn is limited so as to be substantially less than the predetermined depth of the groove. The line thus cannot become disengaged from the body 40 or snag the links 15 despite shock and oscillating loads. This limited elongation combined with the minimum number of such turns also limits movement of the line in the groove as the elongation of the line varies when the connector is subjected to varying tension. Chaffing of the line due to its movement against the groove is correspondingly minimized. Chafing of the line is further minimized by the line return arrangement provided by the helical segments 64 and the use of an effectively endless and thus unanchored line that has no sharp bends and does not pass over any edges. Preferably, such chafing is additionally minimized by polishing the surface of the ridges 56 forming the helical groove 42 and segments 62.

As pointed out above, a connector of the present invention, such as connector 10, can withstand a tension force equal to twice the number of turns of line 20 about body 40 times the tensile breaking strength of the line so that the tensile strength of the line is a fraction of the total tension that the connector can withstand. However, this relation between the line strength and connector strength is only maintained if the line is everywhere subjected to the same tension as at each side of each turn of the helical groove 42. In the present invention, the use of a helical groove and endless line permits the line to move in the groove and equalize the stress on each turn of the line in the groove. However, this structure is made even more effective in equalizing tension in the line by limiting friction between the line and the body 40 and between portions of the line itself. It can be seen that the line which, when of the otherwise advantageous para-aramid material, has a relatively high coefficient of friction against itself, has no contact with itself except at the relatively short return portion 64. The remainder of the line contacts blocks 18 which are typically constructed of aluminum alloy which has a substantially lower coefficient of friction with para-aramid fiber than this fiber material does with itself. Minimization of friction in the present invention is also achieved by the same arrangements which minimize line elongation and chaffing. Specifically, the minimal number of turns provided by high strength material and the minimal line elongation reduce friction producing movement on both steady and varying loads, and friction due to such movement as occurs is minimized by the line return arrangement provided by the helical segments 64, by the absence of sharp bends and passage over edges, and by polishing the surface of the ridges 56 at the helical groove 42.

As best seen in FIG. 2, body 40 has a pair of attachment bores 70 extending through it axially of its cylindrical periphery and opening at each of its end surfaces 54. One of the bores 70 is disposed in each of the blocks 18 between the planar surface 50 and the semicylindrical surface 52 at a plane substantially normal to the planar surface. As apparent from FIG. 1, each bore 70 is configured to receive one of the links 15 in a conventional manner and thus attach the corresponding block to a strap 12 or 13 for connection of these straps by connector 10 when the straps are tensioned in a direction away from the planar surface.

As best shown in FIGS. 2 and 3, body 40 has first and second line cutter recesses or cylindrical bores 75 extending diametrically into the body at the planar surfaces 50 of the blocks 18 when these surfaces are engaged. Bores 75 are spaced axially of the body with the axis of each of the bores intersecting a point centrally of one turn of the helical groove. Each bore 75 opens into the groove at this point and extends from the groove into each block and the body a distance approximately three-quarters of the diameter of the body. Each bore is thus disposed for the reception of one of the pyrotechnic line cutters 24 or 25 with an eye 77 of the cutter aligned with the helical groove. Line 20 is passed through the eyes of both cutters 24 and of 25 as the line is being wrapped about the body and placed in the groove before splicing the line at its portion 64.

Each pyrotechnic cutter 24 or 25 has the above-identified conventional construction and has a cylindrical body 80 slidably fitted in the corresponding bore 75. This body bears eye 77 at one end, and a pair of the firing leads 27 extend from the other end for the ignition of energetic material driving a blade, not shown, which cuts line 20 where extended through the eye. It is evident that the cutter has, at the eye, a cutting end which is in cutting relation with the line where the line is wrapped about the semicylindrical surfaces 52 of blocks 18. It is also evident that the line is severable at the eye of either pyrotechnic cutter so as to release tension in the line and thus release blocks 18 from their engagement to disconnect straps 12 and 13 at connector 10. Since the tensile strength of the line is a fraction of the total tension that the connector can withstand, the pyrotechnic cutters 24 and 25 require a fraction of the energetic material needed in a pyrotechnic cutter capable of severing a single element carrying this total tension. Cutters 24 and 25 are thus relatively small and economical to replace when the connector 10 is to be reused.

As best shown in FIGS. 1 and 2, body 40 has a bore or ruing lead channel 85 extending axially through the body between its end surfaces 54 at the planar surfaces 50 of the blocks 18 when these surfaces are engaged. This channel opens through the inner ends of the bores 75 centrally within the body at the ends of pyrotechnic cutters from which the firing leads 27 extend, and these leads are brought out from the cutters through the channel outwardly of the body at one of its ends 54 for access to the firing leads to connect them to the extended leads 29.

Obviously, many modifications and variations of the present invention are possible in light of the above teachings. It is, therefore, to be understood that the invention may be practiced within the scope of the following claims other than as specifically described above.

What is claimed is:

1. A releasable connector comprising:

a pair of blocks, each of the blocks having a first surface conforming to the first surface of the other block so that the pair of blocks are engageable at the first surfaces, means for connecting the block to an element to be connected by the connector when the element is tensioned in a direction away from the first surface, and a second surface disposed oppositely from the first surface of the block;

a line wrapped about both of the second surfaces of the pair of blocks when the blocks are engaged at the first surfaces, tension in the line holding the pair of blocks in engagement when the element is tensioned in said direction;

a ridge extending from the second surface of each of the blocks, said ridge being disposed so as to retain the line on the second surface against movement of the line in a direction along the first surface of the block; and a selectively actuatable line cutter having a body terminating in a cutting end, said body being disposed in one of the blocks and said cutting end extending from the second surface of the one block into cutting relation with said line where the line is wrapped about the second surface of the one block.

2. The releasable connector of claim 1 wherein:

said second surface of each of the blocks is generally semi-cylindrical so that the second surfaces of both of the blocks define a continuous and generally cylindrical surface when the first surfaces of the blocks are engaged; and the ridge corresponding to each one of the blocks is curved about an axis of the cylindrical surface and has an end at the first surface of the block, the ridges of the blocks being configured so that said end of the ridge of one block is alignable axially of said cylindrical surface with said end of the ridge of the other block.

3. The releasable connector of claim 2 wherein:

the line is endless and has a first portion and a second portion;

said first portion is wrapped in a helical disposition in one direction about the second surfaces of the blocks and is tensioned radially against the second surfaces;

said second portion is wrapped in a helical disposition in an opposite direction about said first portion and is tensioned radially against said first portion oppositely of the second surfaces; and the ridges of each of said blocks are configured so as to retain said first portion in the helical disposition about the second surfaces and to direct said second portion from the first portion into the helical disposition of the second portion about the first portion.

4. The releasable connector of claim 3:

wherein the ridge of each of said blocks is one ridge of a plurality of ridges corresponding to turns of said first portion of the line when the line is wrapped in said helical disposition about the second surface of the blocks, said plurality of ridges of both of said blocks defining a continuous helical groove between adjacent ridges of said plurality of ridges when the blocks are engaged at said first surfaces; and wherein said turns of said first portion of the line are received in said continuous helical groove.

5. The releasable connector of claim 4 wherein one ridge of said plurality of ridges of each of said blocks is disposed at one axial end of said cylindrical surface and defines a helical groove segment returning helically in said opposite direction, said segment diverting the second portion of the line from said helical disposition of the first portion of the line into said helical disposition of the second portion of the line.

6. The releasable connector of claim 4 wherein the element is tensionable in said direction with a predetermined tension, and said continuous helical groove has a predetermined depth radially of said generally cylindrical surface, and the line is constructed so that elongation of the line when the element is tensioned in said direction with said predetermined tension is such that, at said helical groove, said first portion of the line elongates a distance less than said predetermined depth.

7. A device for connecting and for disconnecting a pair of tensionable elements, the device comprising:

a body having a cylindrical periphery defining a helical groove, said body being separable at a diametrical plane into a pair of body portions engageable at said plane, having means for attaching the tensionable elements individually to said body portions, and defining a recess extending diametrically into said body from a point along said helical groove;

a pyrotechnic line cutter having a cylinder extending from an eye and including means for severing a line extending through said eye, said cutter being disposed with said eye aligned with said helical groove and with said cylinder extended from said eye into said recess;

a line extending along said helical groove and through said eye, said line having opposite ends connectable at said cylindrical periphery to tension said line in said helical groove and to maintain said pair of body portions in engagement at said diametrical plane so that the tensionable elements can be connected at the device by tension in said line, and said line being severable at said eye by said pyrotechnic cutter so as to release said tension in said line, whereby said body portions are released from said engagement and said tensionable elements can be disconnected at the device.

8. The device of claim 7 wherein:

said recess is a first recess which extends diametrically into said body from a point in said helical groove, and said body defines a second recess extending diametrically into said body from another point in said helical groove;

said pyrotechnic line cutter is a first pyrotechnic line cutter, and the device further comprises a second pyrotechnic line cutter having a cylinder extending from an eye and including means for severing a line extending through the eye, said second cutter being disposed with said eye of said second pyrotechnic cutter aligned with said helical groove and with said cylinder of said second pyrotechnic cutter extended into said second recess; and said line extends through said eye of said first pyrotechnic cutter and through said eye of said second pyrotechnic cutter so that said line is severable at either of said eyes by the corresponding said pyrotechnic cutter to disconnect the tensionable elements at the device.

9. The device of claim 8 wherein:

said first recess and said second recess extend into said body at said diametrical plane and are spaced axially of said cylindrical periphery;

said body has a pair of axially opposite ends and defines a lead channel extending axially of said cylindrical periphery between said opposite ends, said channel opening into said first recess and into said second recess centrally of said body;

said body defines a pair of attachment openings extending axially of said cylindrical periphery between said opposite ends, one of said attachment openings being disposed in each one of said body portions between said diametrical plane and said cylindrical periphery and being configured for attachment of one of the tensionable elements to said one of said body portions; and each of said pyrotechnic line cutters has a firing lead extending from the cylinder of the pyrotechnic cutter oppositely of the eye of the pyrotechnic cutter, the firing leads of said cutters being disposed so that the firing leads extend from the pyrotechnic cutters and through said lead channel for access to each of the firing leads outwardly of said body from one of said opposite ends of the body.

* * * * *